(12) United States Patent
Fraser

(10) Patent No.: US 8,311,206 B1
(45) Date of Patent: Nov. 13, 2012

(54) FACILITATING COMMUNICATIONS FOR VOICEMAIL SERVICES IN A SYSTEM THAT USES DISPARATE SIGNALING SYSTEMS

(75) Inventor: Andrew Fraser, Richmond (GB)

(73) Assignee: Cisco Technology, Inc., San Jose, CA (US)

( * ) Notice: Subject to any disclaimer, the term of this patent is extended or adjusted under 35 U.S.C. 154(b) by 797 days.

(21) Appl. No.: 12/407,901

(22) Filed: Mar. 20, 2009

(51) Int. Cl.
*H04M 7/00* (2006.01)
*H04M 1/64* (2006.01)
*H04L 12/66* (2006.01)

(52) U.S. Cl. ............... 379/219; 379/67.1; 379/88.17; 379/237; 370/352

(58) Field of Classification Search ............ 379/221, 379/219, 237, 88.08, 88.17, 67.1, 88.18, 379/229; 709/206; 370/352, 395.52
See application file for complete search history.

(56) References Cited

U.S. PATENT DOCUMENTS

| 2005/0135383 A1* | 6/2005 | Shenefiel ............... 370/395.52 |
| 2006/0047767 A1* | 3/2006 | Dodrill et al. ............... 709/206 |
| 2009/0103524 A1* | 4/2009 | Mantripragada et al. ..... 370/352 |

* cited by examiner

*Primary Examiner* — Thjuan K Addy

(57) ABSTRACT

A method and system for performing signaling between a private branch exchange ("PBX") and a voicemail server external to the PBX ("VM server") to facilitate serving voicemail services to a subscriber of the PBX and the voicemail services is provided. The method includes: exchanging, between a first gateway and the PBX, a first signaling message formed in accordance with a first signaling protocol of a digital private network signaling system; exchanging, between the first gateway and a second gateway, a second signaling message formed in accordance with a second signaling protocol for serving voice over internet-protocol services; exchanging, between the second gateway and the VM server, a third signaling message form in accordance with a terminal-control protocol for an internet-protocol network, converting between the first and second signaling messages, at the first gateway; and converting between the second and third signaling messages, at the second gateway.

19 Claims, 10 Drawing Sheets

FACILITATING COMMUNICATIONS FOR VOICEMAIL SERVICES IN A SYSTEM THAT USES DISPARATE SIGNALING SYSTEMS

BACKGROUND

Related Art

In a commercial environment, communication of information among employees of an organization plays a vital role in accomplishing objectives of the organization. Such information may include data related to various business activities of the organization, research & development project information, financial market information, and/or the like type information. To attain accelerated communication of the information among the employees, the organization generally employs multiple communication services, including, for example, voicemail servers, voice services, email services and the like.

Such services have, in the past, been served using a Private Branch Exchange ("PBX") along with multiple user terminals. With recent advancements certain types of newer voice and voicemails systems, such as those that utilize datagrams, the voice and voicemail services now are being served using such systems. As can be imagined, the organization may have the PBX installed at one location (e.g., a remote office location), and have the newer voice and voicemail systems at another location (e.g., corporate headquarters). Thus, the organization may benefit from having the PBX and the newer voice and voicemail system communicate with each other.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DESCRIPTION OF EXAMPLE EMBODIMENTS

Figure 1:
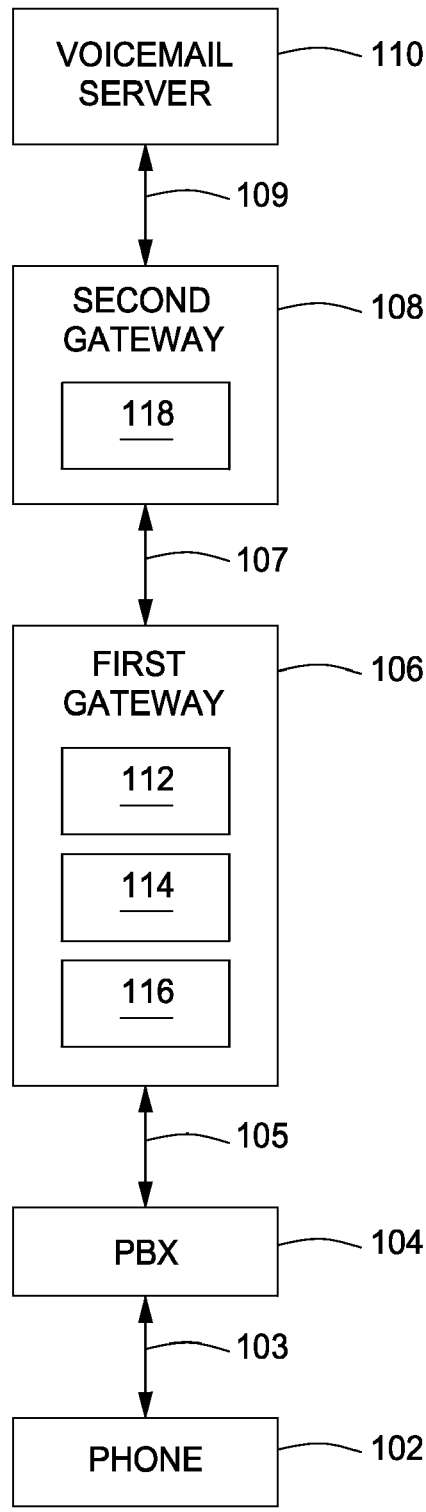
FIG. 1 is a block diagram illustrating an example system 100 for performing signaling between a private branch exchange and a voicemail server.

In the following detailed description, numerous specific details are set forth in order to provide a thorough understanding of example embodiments or other examples described herein. However, it will be understood that these embodiments and examples may be practiced without the specific details. In other instances, well-known methods, procedures, components and circuits have not been described in detail, so as not to obscure the following description. Further, the embodiments and/or examples disclosed are for purposes of example only and other embodiments and/or examples may be employed in lieu of or in combination with the embodiments disclosed.

Overview

Some embodiments of the invention relate to a method of providing voicemail services to a subscriber of a private-branch exchange. The method can include: exchanging, between a first gateway and a private-branch exchange, a first signaling message formed in accordance with a first signaling protocol of a digital private network signaling system; exchanging, between the first gateway and a second gateway, a second signaling message formed in accordance with a second signaling protocol for serving voice over internet-protocol services; exchanging, between the second gateway and a server for serving voicemail services, a third signaling message form in accordance with a terminal-control protocol for an internet-protocol network, converting, at the first gateway, between the first and second signaling messages; and converting, at the second gateway, between the second and third signaling messages.

Some embodiments of the invention relate to a system for providing voicemail services for a phone coupled to a private-branch exchange. The system can include: a first gateway, a second gateway and a server for serving voicemail services. The first gateway can be configured to: (i) exchange with the private-branch exchange a first signaling message that is formed in accordance with a first signaling protocol for a digital private network signaling system; (ii) exchange with the second gateway a second signaling message that is formed in accordance with a second signaling protocol for service voice-over-internet-protocol services; and (iii) convert between the first signaling message and a second signaling message. The second gateway can be configured to: (i) exchange with the first gateway the second signaling message; (ii) exchange with the server a third signaling message that is formed in accordance with a terminal-control protocol for an internet-protocol network; and (iii) convert between the second and third signaling messages. The server can be configured to: (i) exchange with the second gateway the third signaling message, and (ii) serve the voicemail services.

Some embodiments of the invention relate to a system for providing voicemail services for a phone coupled to a private-branch exchange. The system can include: a server configured to: (i) serve the voicemail services; and (ii) transmit a first message, wherein the first message is formed in accordance with a terminal-control protocol for an internet-protocol network; a first gateway configured to: (i) receive the first message; (ii) convert the first message to a second message, wherein the second message is formed in accordance with a first signaling protocol for an integrated services digital network; and (iii) transmit the second message; and a second gateway configured to: (i) receive the second message; (ii) convert the second message to a third message, wherein the third message is formed in accordance with a second signaling protocol for a digital private network signaling system; and (iii) transmit the third message to the private-branch exchange.

Example Architecture

FIG. 1 is a block diagram illustrating an example system 100 for performing signaling between a private branch exchange ("PBX") and a voicemail server external to the PBX ("VM server") to facilitate serving voicemail services to a subscriber of the PBX and the voicemail services. The system 100 may include a user terminal or "phone" 102 assigned to or associated with the subscriber, a PBX 104, a first gateway 106, a second gateway 108 and a VM server 110.

The system 100 allows the PBX 104 and the VM server 110 to interact despite the PBX 104 and the VM server 110 using disparate signaling (i.e., "out-of-band signaling") and signaling-like (i.e., "in-band signaling") systems. The system 100, for example, allows the PBX 104 and VM server 110 to serve the voicemail services to the subscriber despite (i) the PBX 104 using signaling messages of a digital private network signaling system ("DPNSS"), such as defined in British Telecom Networking Requirement (BTNR)-188, and (ii) the VM server 110 using signaling messages for an a terminal-control protocol of an internet protocol ("IP") network, such as the skinny call control protocol ("SCCP").

As described in more detail below, the PBX 104, first gateway 106, second gateway 108 and VM server 110 may exchange (e.g., send and/or receive), via communication links 105, 107 and 109, a number of signaling and/or signaling-like (collectively "signaling") messages. These signaling messages may facilitate establishing, maintaining and/or tearing down one or more communications for serving the voicemail services to the subscriber. At least a portion of these signaling messages may flow upstream from the PBX 104 to the VM server 110, and at least a portion of the signaling messages may flow downstream from the VM server 110 to any of the second gateway 108, first gateway 106 and PBX 104. The signaling messages that flow upstream ("upstream-signaling messages") may facilitate the communications from the phone 102 to the VM server 110 ("upstream-vm communications"). The signaling messages that flow downstream ("downstream-signaling messages") may facilitate the communications from the VM server 110 to the phone 102 ("downstream-vm communications").

As used herein, the terms "upstream" and "downstream" denote directionality for exposition purposes only. In addition, the terms "upstream" and "downstream" do not denote any of a master-slave, client-server, peer-to-peer and like-type relationship among any of the phone 102, PBX 104, first gateway 106, second gateway 108 and VM server 110.

The phone 102 may be, for example, any of a desk phone, mobile phone, cordless phone, cellular phone, personal communications services ("PCS") phone, a computer (e.g., a desktop, a laptop), a personal digital assistant ("PDA"), and any other computing device adapted to exchange (e.g., send an/or receive) voice and/or data with the PBX 104. The phone 102 and the PBX 104 may communicatively couple via the first communication link 103.

The phone 102 and the PBX 104 may form the first communication link 103 over any of a wired and/or wireless medium. And for the upstream-vm communications or for downstream-vm communications carried over the first communication link 103, the PBX 104 may use a first signaling protocol. This first signaling protocol may be defined, for example, in accordance with signaling system seven ("SS7") or the DPNSS. Alternatively and/or additionally, the given signaling protocol may be defined in accordance with a wireless communication protocol, such as IEEE 802.11 ("WiFi"), IEEE 802.16 ("WiMax"), General Packet Radio Service (GPRS), Digital Enhanced Cordless Telecommunication (DECT) and the like.

The PBX 104 may communicatively couple to the first gateway 106 via the second communication link 105. The PBX 104 and the first gateway 106 may form the second communication link 105 over any of a wired and/or wireless medium. And to facilitate carrying out the upstream-vm and/or downstream-vm communications over the second communication link 105, the PBX 104 and the first gateway 106 may exchange one or more signaling messages formed in accordance with the DPNSS ("DPNSS messages").

The DPNSS messages for facilitating the upstream-vm communications ("upstream-DPNSS messages") may correspond to an indication for interaction with the VM server 110 ("upstream-interaction indicator"). This upstream-interaction indication may be, for example, an off-hook condition, a command sent in response to a query from the VM server 110, etc.

The DPNSS messages for facilitating the downstream-vm communications ("downstream-DPNSS messages") may correspond to an indication for interaction with the PBX 104 ("downstream-interaction indicator"). This downstream-interaction indication may be, for example, a command or a query sent from the VM server 110.

In addition to communicatively coupling to the PBX 104, the first gateway 106 may communicatively couple to the second gateway 108 via the third communication link 107. The first gateway 106 and the second gateway may form the third communication link 107 over any of a wired and/or wireless medium. To facilitate carrying out the upstream-vm and/or downstream-vm communications over the third communication link 107, the first and second gateways 106, 108 may exchange one or more respective signaling messages formed in accordance with H.225 ("H.225 messages"). For the upstream-vm communications, the first gateway 106 may convert between the upstream-DPNSS messages and upstream-H.225 messages. The first gateway 106 may also convert between the downstream-H.225 messages and the downstream-DPNSS messages. Note that the term "convert" or "conversion" with respect to messages is meant to encompass both an actual conversion of messages in one format to another format, as well as encapsulating or tunneling messages of one format into messages of another format. Encapsulation/tunneling are effectively conversion, since input messages having one format are output in a different format. However, with encapsulation/tunneling, the original message format is not lost, but is rather encapsulated by another format.

To carry out its functions, the first gateway 106 may include a number of elements, most of which are not shown for simplicity of exposition. Typically, the first gateway 106 includes a processor-based platform that operates on any suitable operating system and other software for carrying out functions described herein. The first gateway 106 may be formed as or in a single unitary device and concentrated on such device. Alternatively, the first gateway 106 may be formed in or from one or more separate devices, and as such, may be distributed among a number of devices. The first gateway 106 may be scalable; i.e., the first gateway 106 may employ any of a scale-up and scale-out approach. In addition, the first gateway 106 may be integrated into or otherwise combined with another apparatus.

The first gateway 106 includes one or more processing units (collectively "processor"), memory, one or more input/output ("I/O") interfaces and support circuits. Any of the processor, memory, I/O interfaces and support circuits may communicatively couple via one or more communication links or busses. The first-gateway memory may store various software packages, including the operating system and a number of functional modules ("first-gateway modules"). The operating system may include one or more programmable and/or hard-coded functions, instructions, commands, directions, code and/or control data (collectively, "directives") for operating the first gateway 106. When retrieved from the first-gateway memory and executed by the processor, the first gateway 106 becomes a platform onto which the first-gateway modules can be executed.

Each of first-gateway modules includes one or more directives for causing the first-gateway processor and/or the first gateway 106 to carry out functions defined by such functional modules to facilitate, at least in part, one or more conversion between signaling protocols. Any of the first-gateway modules may be in any of a standalone, client/server, peer-to-peer and other format.

Although each of first-gateway modules is described herein as software packages, the first-gateway modules and/or the directives thereof may be formed in hardware and/or firmware. For example, the first-gateway modules and/or the directives thereof may be ported or otherwise arranged for and implemented in any of a field-programmable-gate array ("FPGA"), application-specific-integrated circuit ("ASIC"), system-on-a chip ("SoC") and complex-programmable-logic device ("CPLD").

The first-gateway modules may include a first conversion engine 112, a second conversion engine 114 and a third conversion engine 116. The first, second and third conversion engines 112, 114 and 116 may carrying out respective interim conversions to cause the conversions between the DPNSS messages and the H.225 messages.

The first conversion engine 112 may carry out the first interim conversions, for example, by converting between the DPNSS messages and signaling messages defined in accordance with a media gateway control protocol ("MGCP messages"). The first conversion engine 112 may be referred to as the "DPNSS/MGCP-conversion engine". For upstream-vm communications, the DPNSS/MGCP-conversion engine 112 may tunnel or otherwise encapsulate (collectively "tunnel") DPNSS messages into MGCP messages. For downstream-vm communications, the DPNSS/MGCP-conversion engine 112 may de-tunnel, de-capsulate, or otherwise extract (collectively "extract") DPNSS messages from the MGCP messages.

The DPNSS/MGCP-conversion engine 112 may also exchange the upstream and/or downstream MGCP messages with the second conversion engine 114. The second conversion engine 114 may carry out the second interim conversions by converting between upstream and/or downstream DPNSS messages and signaling messages defined in accordance with an integrated services digital network user part protocol, e.g., EISUP messages. To facilitate the second interim conversions, the second conversion engine ("DPNSS/EISUP-conversion engine") 114 may use DPNSS and EISUP.

In particular, the DPNSS/EISUP-conversion engine 114 may use one or more facility informational elements defined in accordance with Q signaling ("Qsig IEs"). The Qsig IEs for the downstream-vm communications ("downstream-Qsig IEs") and upstream-vm communications ("upstream-Qsig IEs") are representative or otherwise indicative of the downstream-interaction indicators and the upstream-DPNSS messages, respectively. By virtue of the relationship with the upstream-DPNSS messages, the upstream-Qsig IEs may also be indicative of the upstream-interaction indicator. The DPNSS/EISUP-conversion engine 114 may, for the upstream-vm communications, extract the DPNSS messages from the upstream-MGCP messages, and then tunnel such DPNSS messages as upstream-Qsig IEs into upstream-EISUP messages. For downstream-vm communications, the DPNSS/EISUP-conversion engine 114 may obtain downstream DPNSS messages from the downstream-Qsig IEs in the downstream-EISUP messages, and tunnel the downstream DPNSS messages into the downstream-MGCP messages. The DPNSS/EISUP-conversion engine 114 may also exchange the upstream and/or downstream EISUP messages with the third conversion engine 116.

The third conversion engine 116 may carry out the third interim conversions by converting between the EISUP messages and the H.225 messages. To facilitate the third interim conversions, the third conversion engine ("EISUP/H.225-conversion engine") 116 may use the EISUP and H.225. The EISUP/H.225-conversion engine 116 may, for the upstream-vm communications, extract the upstream-Qsig IEs from upstream-EISUP messages, and then tunnel such upstream-Qsig IEs into the upstream-H.225 messages. For downstream-vm communications, the EISUP/H.225-conversion engine 116 may extract the downstream-Qsig IEs from the downstream-H.225 messages, and then tunnel them into the downstream-EISUP messages.

In addition to communicatively coupling to the first gateway 106, the second gateway 108 may communicatively couple to the VM server 110 via the fourth communication link 109. The second gateway 108 and VM server 110 may form the fourth communication link 109 over any of a wired and/or wireless medium. To facilitate carrying the upstream-vm and/or downstream-vm communications over the fourth communication link 109, the second gateway 108 and VM server 110 may exchange one or more signaling messages defined in accordance with the SCCP ("SCCP messages"). And for any of the upstream-vm and/or downstream-vm communications, the second gateway 106 may also convert between the H.225 messages and the SCCP messages.

The second gateway 108 may include a number of elements to carry out its functions; most of such elements are not shown for simplicity of exposition. The second gateway 108, like the first gateway 106, includes a processor-based platform that operates on any suitable operating system and other software for carrying out functions described herein. The second gateway 108 may be formed as or in a single unitary device and concentrated on such device. Alternatively, the second gateway 108 may be formed in or from one or more separate devices, and as such, may be distributed among a number of devices. The second gateway 108 may be scalable; i.e., employ any of a scale-up and scale-out approach. In addition, the second gateway 108 may be integrated into or otherwise combined with another apparatus.

The second gateway 108 includes a processor, memory, one or more I/O interfaces and support circuits. Any of the processor, memory, I/O interfaces and support circuits may communicatively couple via one or more communication links or busses. The second-gateway memory may store various software packages, including the operating system and a number of functional modules ("second-gateway modules"). The operating system may include one or more programmable and/or hard-coded functions, instructions, commands, directions, code and/or control data (collectively, "directives") for operating the second gateway 108. When retrieved from the second-gateway memory and executed by the processor, the second gateway 108 becomes a platform onto which the second-gateway modules can be executed.

Each of second-gateway modules includes one or more directives for causing the processor and/or the second gateway 108 to carry out functions defined by such functional modules to facilitate, at least in part, one or more conversion between signaling protocols. Any of the second-gateway modules may be in any of a standalone, client/server, peer-to-peer and other format.

Although each of second-gateway modules is described herein as software packages, the second-gateway modules and/or the directives thereof may be formed in hardware and/or firmware. The second-gateway modules and/or the directives thereof may be, for example, ported or otherwise arranged for and implemented in any of a FPGA, ASIC, SoC and CPLD.

The second-gateway modules may include a fourth conversion engine 118 for carrying out conversions between the H.225 messages and the SCCP messages. In addition to using the H.225 and SCCP for the conversions, the fourth conversion engine ("H.225/SCCP-conversion engine") 118 may, for the upstream-vm communications, extract the upstream-Qsig IEs from the upstream-H.225 messages, and then tunnel such upstream-Qsig IEs into the upstream-SCCP messages. For downstream-vm communications, the H.225/SCCP-conversion engine 118 may extract the downstream-Qsig IEs from downstream-SCCP messages, and then tunnel them into the downstream-H.225 messages.

The VM server 110 may process the upstream-SCCP messages to discover or otherwise obtain the upstream-interaction indicator. The VM server 110 may do this by extracting the upstream-Qsig IEs from the upstream-SCCP messages.

The VM server 110 may also generate the downstream-interaction indicators, and may do so responsive to the upstream-interaction indicator or, alternative, sua sponte. In addition, the VM server 110 may obtain the downstream-Qsig IEs and tunnel downstream-Qsig IEs into the downstream-SCCP messages.

To facilitate its functions the VM server 110 may include a number of elements, most of which are not shown for simplicity of exposition. Typically, the VM server 110 includes a processor-based platform that operates on any suitable operating system and other software for carrying out functions described herein. The VM server 110 may be formed as or in a single unitary device and concentrated on such device. Alternatively, the VM server 110 may be formed in or from one or more separate devices, and as such, may be distributed among a number of devices. The VM server 110 may be scalable; i.e., employ any of a scale-up and scale-out approach. In addition, the VM server 110 may be integrated into or otherwise combined with another apparatus.

The VM server 110 includes one or more processing units (collectively "processor"), memory, one or more input/output ("I/O") interfaces and support circuits. Any of the processor, memory, I/O interfaces and support circuits may communicatively couple via one or more communication links or busses. The VM-server memory may store various software packages, including the operating system and a number of functional modules ("VM-server modules"). The operating system may include one or more programmable and/or hard-coded functions, instructions, commands, directions, code and/or control data (collectively, "directives") for operating the VM server 110. When retrieved from the VM-server memory and executed by the processor, the VM server 110 becomes a platform onto which the VM-server modules can be executed.

Each of VM-server modules includes one or more directives for causing the VM-server processor and/or the VM server 110 to carry out functions defined by such functional modules to facilitate, at least in part, signaling and providing the voicemail services. Any of the VM-server modules may be in any of a standalone, client/server, peer-to-peer and other format.

Although each of the VM-server modules is described herein as software packages, the VM-server modules and/or the directives thereof may be formed in hardware and/or firmware. The VM-server modules and/or the directives thereof may be ported or otherwise arranged for and implemented in any of an FPGA, ASIC, SoC and CPLD.

The VM-server modules may include one or more modules for providing the voicemail services. The voicemail services may include, managing incoming voicemails for the subscriber (e.g., storing incoming voicemails in a voicemail inbox, forwarding the incoming voicemails and/or the like), providing an interactive voice response ("IVR") feature (e.g., playing a greeting message to a caller) and the like.

Additionally and/or alternatively, the communication system 100 may employ an access network (not shown in the FIG. 1) for interfacing the user terminal such as the phone 102 with the PBX 104. The access network may use signaling protocols for interfacing with the PBX 104 as defined in standards such as, SONET/SDH, V 5.2 and/or the like. Additionally, the PBX 104 may be an Internet Protocol (IP) based PBX. The PBX 104 may use internet protocols for interfacing the phone 102 and the phone 102 may be an IP based phone.

During an operation, such as an accessing the VM server 110, the phone 102 sends an information to the PBX 104. For example, the information may contain a request for retrieving the voicemail from the VM server 110. In addition, such information may be transmitted using Dual Tone Multiple Frequency (DTMF) signals. Alternatively, the information is sent in accordance with the interface protocols used for interfacing the phone 102 and the PBX 104.

Example Operation

Figure 2:
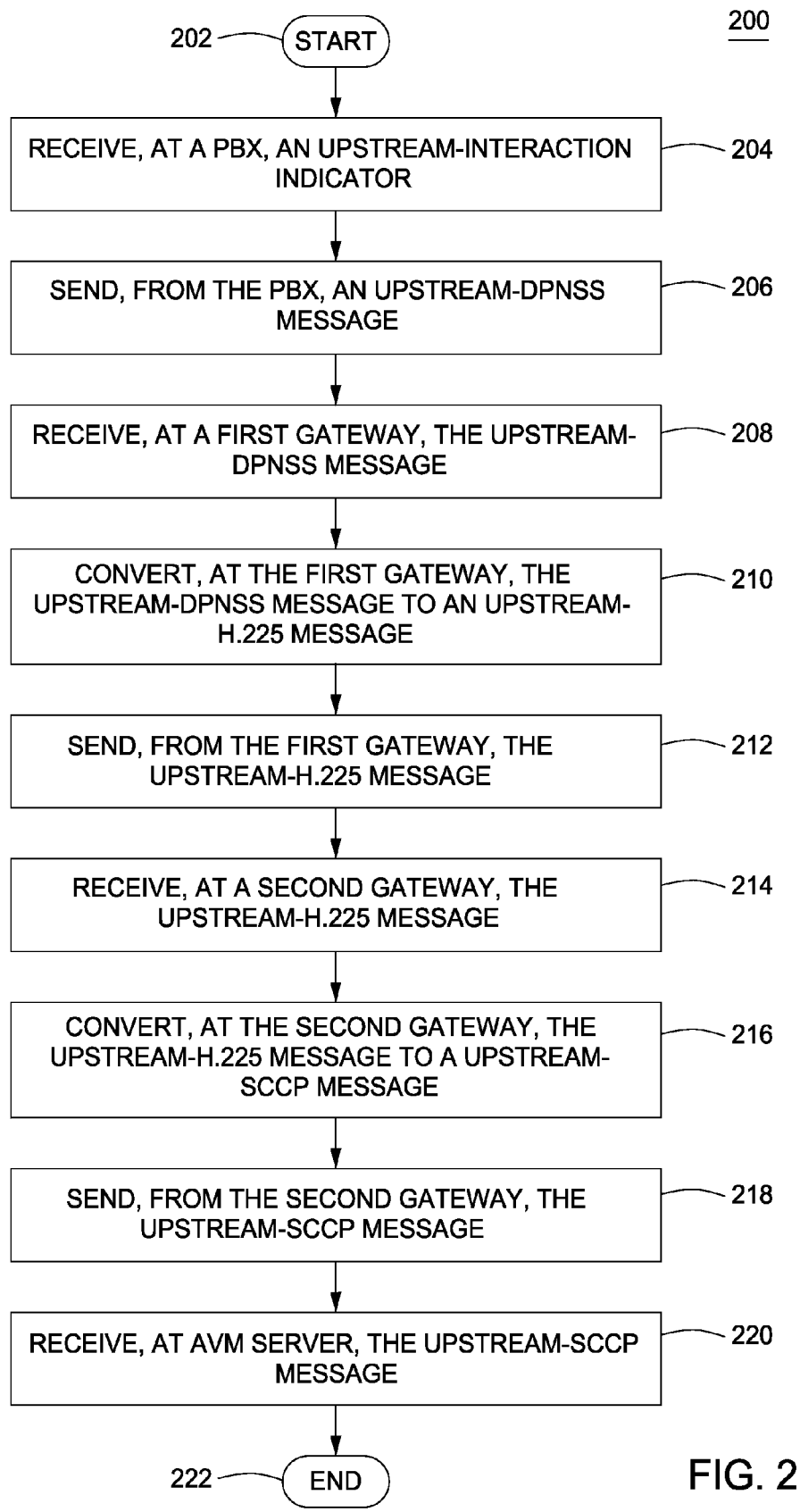
FIG. 2 is a flow diagram illustrating a first example flow for performing signaling between a private branch exchange and a voicemail server.

FIG. 2 is a flow diagram illustrating an example flow 200 for performing signaling between a PBX and a VM server to facilitate serving voicemail services to a subscriber of the PBX and the voicemail services. For simplicity of exposition, the flow 200 is described with reference to the system 100 of FIG. 1. The flow 200, however, may be carried out by other communication systems as well.

Performing the flow 200 allows the PBX 104 and the VM server 110 to interact despite the PBX 104 and the VM server 110 using disparate signaling systems. For example, the flow 200 allows the PBX 104 and VM server 110 to serve the voicemail services to the subscriber despite (i) the PBX 104 using the DPNSS messages and (ii) the VM server 110 using SCCP signaling messages.

The flow 200 starts at termination block 202. Prior to termination block 202, each of the PBX 104, first gateway 106, second gateway 108 and VM server 110 become operative, such that their various software packages are retrieved from their respective memories and executed by their respective processors, thereby, making each of the PBX 104, first gateway 106, second gateway 108 and VM server 110 specially programmed computers to carry out any of the functions noted above and below. Any reference below to the various software packages assumes that such software package is (and directives therein are) under execution.

After the termination block 202, the flow 200 may transition to process block 204. At the process block 204, the PBX 104 detects or otherwise receives from the phone 102 the upstream-interaction indicator. After the process block 204, the flow 200 may transition to process block 206, whereupon the PBX 104 sends to the first gateway 106 an upstream-DPNSS message so as to initiate the interaction with the VM server 110. Thereafter, the flow may transition to process block 208.

At the process block 208, the first gateway 106 receives the upstream-DPNSS message from the PBX 104. Thereafter the flow 200 may transition to process block 210.

At process block 210, the first gateway 106 converts the upstream-DPNSS message into an upstream-H.225 message.

To facilitate this, the first gateway 106 may pass the upstream-DPNSS message to the DPNSS/MGCP-conversion engine 112. After receipt, the DPNSS/MGCP-conversion engine 112 may convert the upstream DPNSS message into an upstream-MGCP message, and then pass the upstream-MGCP message to the DPNSS/EISUP-conversion engine 114

The DPNSS/EISUP-conversion engine 114 may then extract the upstream-DPNSS message and/or upstream-interaction indicator. Then, the DPNSS/EISUP-conversion engine 114 may generate an upstream-EISUP message, and tunnel the upstream-DPNSS message as upstream-Qsig IEs with the upstream-EISUP message. The DPNSS/EISUP-conversion engine 114 may then pass the upstream-EISUP message to the EISUP/H.225-conversion engine 116. After receipt, the EISUP/H.225-conversion engine 116 may extract the upstream-Qsig IEs from the upstream-EISUP signaling message. Thereafter, the EISUP/H.225-conversion engine 116 may generate an upstream-H.225 message, and tunnel the upstream-Qsig IEs into the upstream-H.225 message. After generation of the upstream-H.225 message, the flow 200 may transition to process block 212.

At the process block 212, the first gateway 106 or, more specifically, the EISUP/H.225-conversion engine 116 may then send the first H.225 signaling message to the second gateway 108. The second gateway 108, at the process block 214, receives the upstream-H.225 message. Thereafter, the flow 200 may transition to process block 216.

At the process block 216, the second gateway 108 converts the upstream-H.225 message into an upstream-SCCP message. To facilitate this, the second gateway 108 may pass the upstream-H.225 message to the H.225/SCCP-conversion engine 118. The H.225/SCCP-conversion engine 118 may then extract the upstream-Qsig IEs from the upstream-H.225 message. Thereafter, the H.225/SCCP-conversion engine 118 may generate the upstream-SCCP message, and tunnel the upstream-Qsig IEs into such upstream-SCCP message. Thereafter, the flow 200 may transition to process block 218.

At the process block 218, the second gateway 108 or, more specifically, the H.225/SCCP-conversion engine 118 may then send the upstream-H.225 message to the VM server 110. In turn, the VM server 110, at process block 220, receives the upstream-SCCP signaling message. Thereafter, the VM server 110 may extract the upstream-Qsig IEs from the upstream-SCCP message, and then use the upstream-Qsig IEs to facilitate interaction between the phone 102 and the voicemail services.

After the process block 220, the flow 200 may transition to termination block 222. At the termination block 222, the flow 200 terminates. Alternatively, the flow 200 may be repeated periodically, in continuous fashion, or upon being triggered as a result of a condition, such as an impetus to switch to different content. Alternatively and/or additionally, any of the process blocks 206-214 may be repeated periodically, in continuous fashion, or upon being triggered as a result of a condition, without repeating the entire flow 200. Other combinations and permutations are possible as well.

Figure 3A:
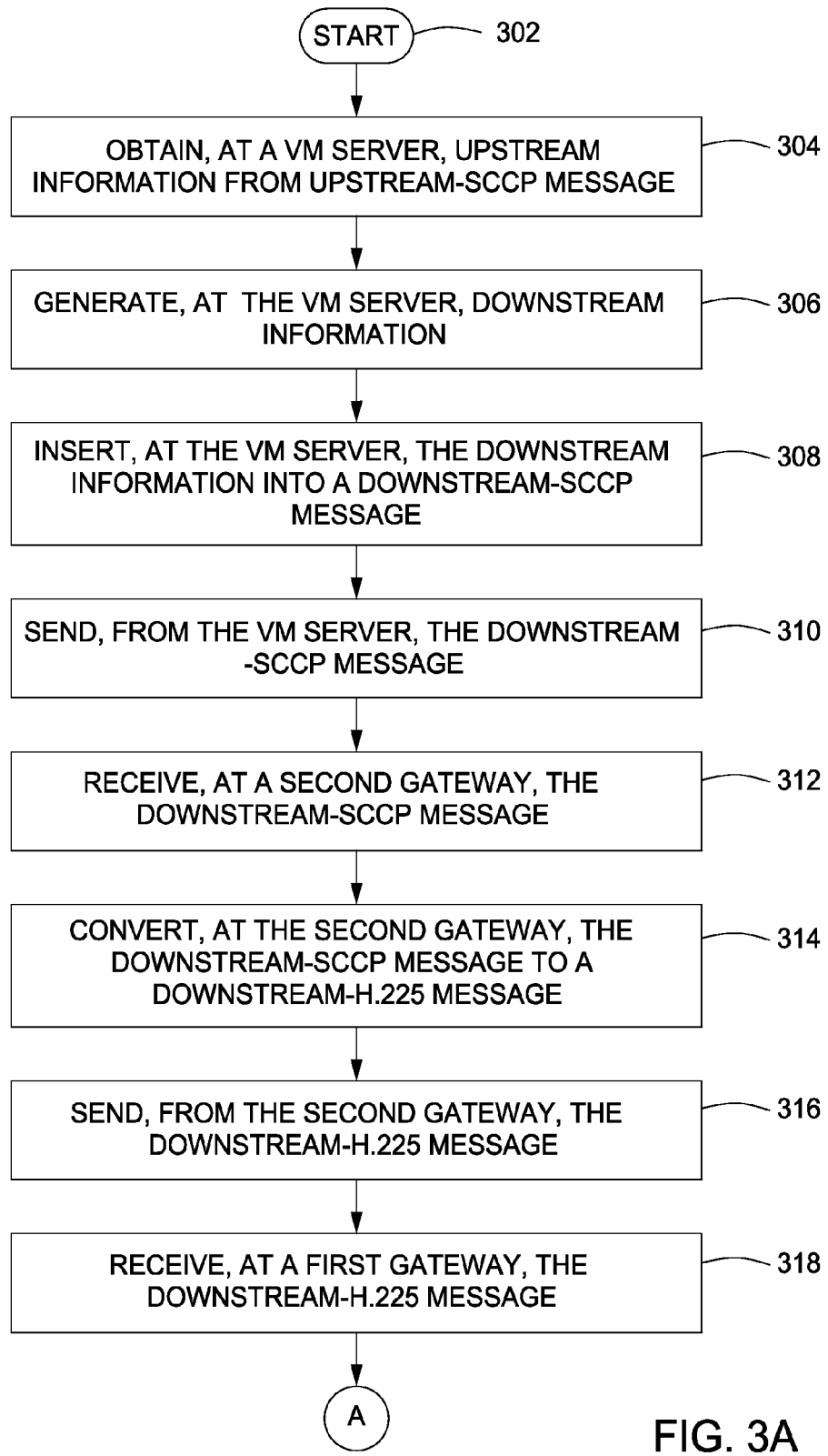
FIG. 3 is a flow diagram illustrating a second example flow for performing signaling between a private branch exchange and a voicemail server.
Figure 3B:
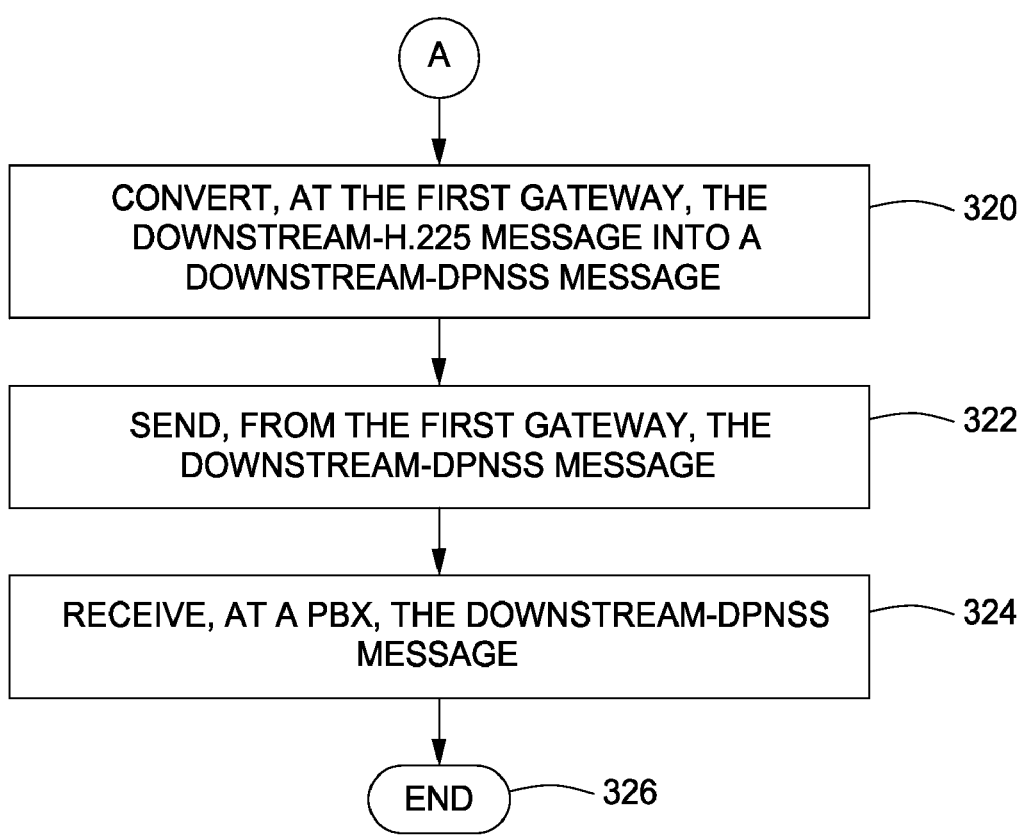

FIG. 3 is a flow diagram illustrating an example flow 300 for performing signaling between a PBX and a VM server to facilitate serving voicemail services to a subscriber of the PBX and the voicemail services. For simplicity of exposition, the flow 300 is described with reference to the system 100 of FIG. 1 and the flow 200 of FIG. 2. The flow 300, however, may be carried out by other communication systems as well.

Like the flow 200 of FIG. 2, performing the flow 300 allows the PBX 104 and the VM server 110 to interact despite the PBX 104 and the VM server 110 using disparate signaling systems. The flow 300, for example, allows the PBX 104 and VM server 110 to serve the voicemail services to the subscriber despite (i) the PBX 104 using DPNSS messages and (ii) the VM server 110 using SCCP messages.

The flow 300 starts at termination block 302. Prior to termination block 302, each of the PBX 104, first gateway 106, second gateway 108 and VM server 110 become operative, such that their various software packages are retrieved from their respective memories and executed by their respective processors, thereby, making each of the PBX 104, first gateway 106, second gateway 108 and VM server 110 specially programmed computers to carry out any of the functions noted above and below. Any reference below to the various software packages assumes that such software package is (and directives therein are) under execution.

After the termination block 302, the flow 300 may transition to process block 304, whereupon the VM server 110 obtains upstream information from the upstream-SCCP message (e.g., received via the process block 220 of FIG. 2). After the process block 304, the flow 300 may transition to process block 306.

In response to the upstream information, the VM server 110 generates downstream information, at process block 306. At process block 308, the VM server 110 inserts the downstream information into the downstream-SCCP message. Thereafter, the flow 300 may transition to process block 310. At the process block 310, the VM server 110 sends the downstream-SCCP message to the second gateway 108.

At process block 312, the second gateway 108 receives the downstream-SCCP message. After such reception, the flow 300 may transition to process block 314.

At the process block 314, the second gateway 108 converts the downstream-SCCP message into downstream-Qsig IEs, which are tunneled over a downstream-H.225 message. To do this, the second gateway 108 may pass the downstream-SCCP message to the H.225/SCCP-conversion engine 118. The H.225/SCCP-conversion engine 118 may then extract the downstream information from the downstream SCCP message and form downstream-Qsig IEs from the downstream information. Thereafter, the H.225/SCCP-conversion engine 118 may generate the downstream-H.225 message, and tunnel the downstream-Qsig IEs into such downstream-H.225 message. After conversion, the flow 300 may transition to process block 316.

At the process block 316, the second gateway 108 or, more specifically, the H.225/SCCP-conversion engine 118 sends the downstream-H.225 message to the first gateway 106. Thereafter, the flow 300 may transition to process block 318, whereupon, the first gateway 106 receives the downstream-H.225 message. After receipt, the flow 300 may transition to process block 320, at which the first gateway 106 converts the downstream-H.225 message to a downstream-DPNSS message.

To facilitate this, the first gateway 106 may pass the downstream-H.225 message to the EISUP/H.225-conversion engine 116. After receipt, the EISUP/H.225-conversion engine 116 may then extract the downstream-Qsig IEs from the downstream-H.225 message. The EISUP/H.225-conversion engine 116 then generates a downstream-EISUP message and tunnels the downstream-Qsig IEs into such downstream-EISUP message. The EISUP/H.225-conversion engine 116 may then pass the downstream-EISUP message to the DPNSS/EISUP-conversion engine 114.

After receipt, the DPNSS/EISUP-conversion engine 114 may then extract the downstream-Qsig IEs from the downstream-EISUP message. Then, the DPNSS/EISUP-conversion engine 114 converts the downstream-Qsig IEs into a downstream-DPNSS message, generates a downstream- MGCP message, and tunnels the downstream-DPNSS message into the downstream-MGCP message. The DPNSS/EISUP-conversion engine 114 may pass the downstream-MGCP message to the DPNSS/MGCP-conversion engine 112. After receipt, the DPNSS/MGCP-conversion engine 112 extracts the downstream-DPNSS message from the downstream-MGCP message.

The flow 200 may transition to process block 322 after the process block 320. At the process block 322, the first gateway 106 or, more specifically, the DPNSS/MGCP-conversion engine 112 may send the downstream-DPNSS message to the PBX 104. Thereafter, the flow 300 may transition to process block 324.

At the process block 324, the PBX 104 receives the downstream-DPNSS message. The VM server 110 may then use the downstream-DPNSS message to further facilitate the interaction between the phone 102 and the voicemail services.

After the process block 324, the flow 300 may transition to termination block 326. At the termination block 326, the flow 300 terminates. Alternatively, the flow 300 may be repeated periodically, in continuous fashion, or upon being triggered as a result of a condition, such as an impetus to switch to different content. Alternatively and/or additionally, any of the process blocks 302-324 may be repeated periodically, in continuous fashion, or upon being triggered as a result of a condition, without repeating the entire flow 300. Other combinations and permutations are possible as well.

Alternative Example Architecture

Figure 4:
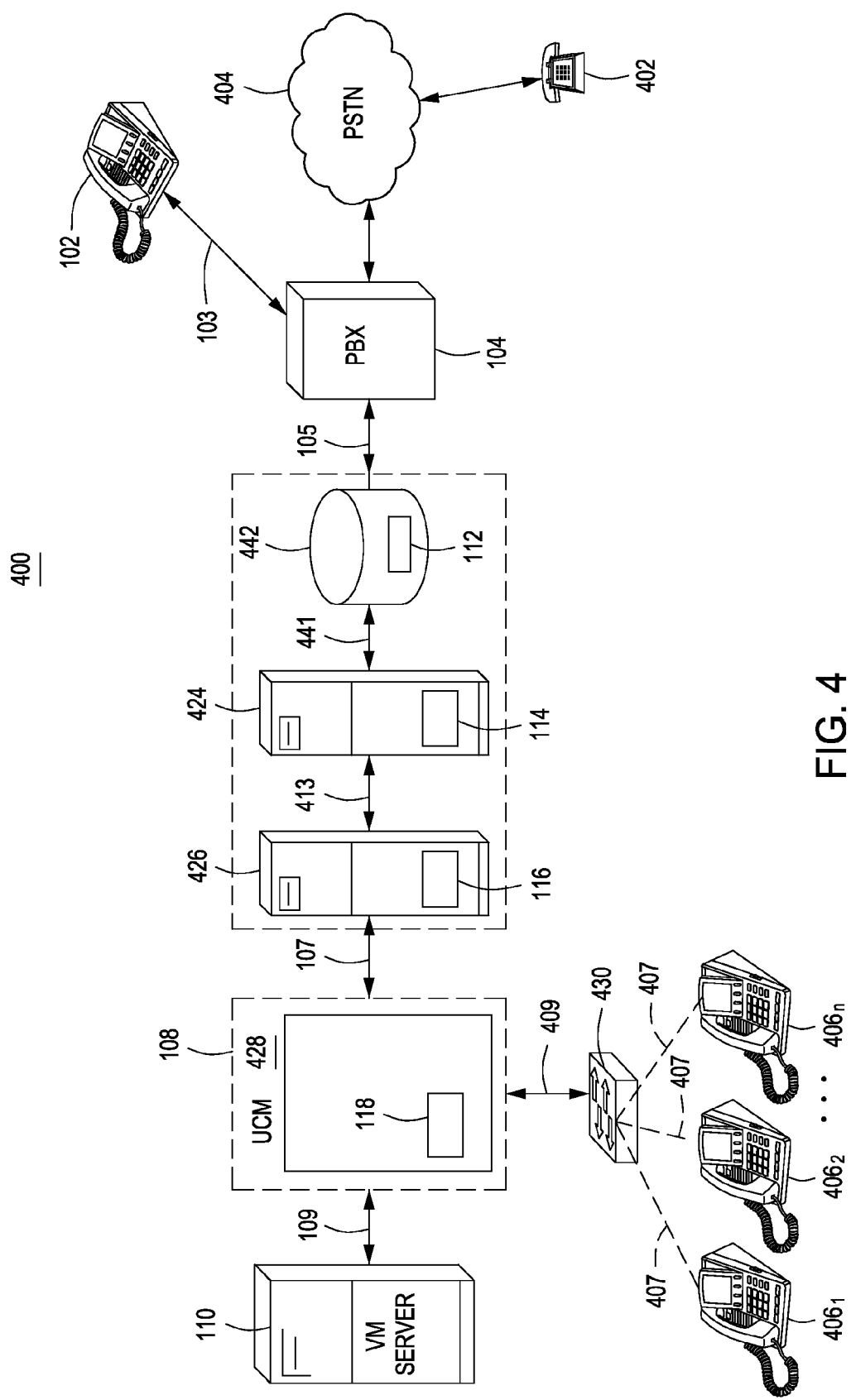
FIG. 4 is a block diagram illustrating an alternative example system for performing signaling between a private branch exchange and a voicemail server.

FIG. 4 is a block diagram illustrating an example system 400 for performing signaling between a PBX and a VM server to facilitate serving voicemail services to a subscriber of the PBX and the voicemail services. The system 400 is similar to the system 100 of FIG. 1, except as described herein. The system 400 may include the phone 102, the PBX 104, the first gateway 106, the second gateway 108 and VM server 110 along with a black phone 402, a network node 430, and multiple IP phones $406_1, 406_2 \ldots 406_n$ (hereinafter referred to as "IP phones 406").

The system 400 allows the PBX 104 and the VM server 110 to interact despite the PBX 104 and the VM server 110 using disparate signaling systems. The system 400, for example, allows the PBX 104 and VM server 110 to serve the voicemail services to the subscriber despite (i) the PBX 104 using DPNSS messages, and (ii) the VM server 110 using SCCP messages.

The black phone 402 may be, for example, any of a desk phone, mobile phone, cordless phone, cellular phone, PCS phone, a computer (e.g., a desktop, a laptop), a PDA, and any other computing device adapted to exchange (e.g., send an/or receive) voice and/or data with the PBX 104. The black phone 403 and the PBX 104 may communicatively couple via a Public Switched Telephone Network ("PSTN") 404. For upstream-vm communications or for downstream-vm communications carried over the PSTN 404, the PBX 104 and the black phone 402 may use the first signaling protocol, which may be, for example, SS7 or the DPNSS. As an alternative to the PSTN 404, the black phone 402 may communicatively couple with the PBX 104 over a wireless medium (not shown), and use a signaling protocol may be defined in accordance with a wireless communication protocol, such as WiFi, WiMax, GPRS, DECT and the like.

The first gateway 106 includes first, second and third computing platforms 422, 424 and 426; each of which may be formed as or in a single unitary device and concentrated on such device. Alternatively, each of the first, second and third computing platforms 422, 424 and 426 may be formed in or from one or more separate devices, and as such, may be distributed among a number of devices. Each of the first, second and third computing platforms 422, 424 and 426 may be scalable; i.e., each may employ any of a scale-up and scale-out approach. And each of the first, second and third computing platforms 422, 424 and 426 may be integrated into or otherwise combined with another apparatus.

The first, second and third computing platforms 422, 424 and 426 include respective processors, memories, I/O interfaces and support circuits. The respective processors, memories, I/O interfaces and support circuits may communicatively couple via one or more respective communication links or busses.

The memories may store various software packages, including the operating systems and functional modules. The respective operating systems may include directives for operating the first, second and third computing platforms 422, 424 and 426. When retrieved from the memories and executed by the processors, the first, second and third computing platforms 422, 424 and 426 become platforms onto which the functional modules can be executed.

Each of functional modules includes one or more directives for causing the respective processors and/or the first, second and third computing platforms 422, 424 and 426 to carry out functions defined by such functional modules to facilitate, at least in part, providing conversion between signaling protocols. Any of the functional modules may be in any of a standalone, client/server, peer-to-peer and other format.

Although the functional modules are described herein as software packages, the functional modules and/or the directives thereof may be formed in hardware and/or firmware. For example, the functional modules and/or the directives thereof may be ported or otherwise arranged for and implemented in any of a FPGA, ASIC, SoC and CPLD.

The first computing platform 422 may be or embody a signaling gateway portion of a media gateway defined in accordance with the MGCP, and as shown, includes the DPNSS/MGCP-conversion engine 112. The second computing platform 424 may be or embody a call agent of the media gateway, and as shown, includes the DPNSS/EISUP-conversion engine 114. The third computing platform 426 may be or embody a H.323 signaling interface ("HSI") coupled to the media gateway, and as shown, includes the EISUP/H.225-conversion engine 116. Examples of media gateways include Cisco MGX® Series, Cisco Integrated Services Routers and Cisco universal gateways such as the Cisco AS5300 and AS5400 Series and the like. Examples of the call agent may include a multi-protocol converter device and/or a soft gateway, such as a Cisco Public Switched Telephone Network Gateway. An example of the HSI includes a Cisco H.323 Signaling Interface.

The DPNSS/MGCP-conversion engine 112 and the DPNSS/EISUP-conversion engine 114 may communicatively couple via a first-gateway-communication link 411. The DPNSS/MGCP-conversion engine 112 and the DPNSS/EISUP-conversion engine 114 may form the first-gateway-communication link 411 over any of a wired and/or wireless medium. And to facilitate carrying out the upstream-vm and/or downstream-vm communications over the first-gateway-communication link 411, the DPNSS/MGCP-conversion engine 112 and the DPNSS/EISUP-conversion engine 114 may exchange the upstream-MGCP messages and downstream-MGCP messages, respectively.

The DPNSS/EISUP-conversion engine 114 and the EISUP/H.225-conversion engine 116 may communicatively couple via a second-gateway-communication link 413. The DPNSS/EISUP-conversion engine 112 and the EISUP/

H.225-conversion engine 116 may form the second-gateway-communication link 413 over any of a wired and/or wireless medium. To facilitate carrying out the upstream-vm and/or downstream-vm communications over the second-gateway-communication link 413, the DPNSS/EISUP-conversion engine 114 and the EISUP/H.225-conversion engine 116 may exchange the upstream-EISUP messages and downstream-MGCP messages, respectively.

The second gateway 108 includes a fourth computing platform 428, which may be formed as or in a single unitary device and concentrated on such device. Alternatively, the fourth computing platform 428 may be formed in or from one or more separate devices, and as such, may be distributed among a number of devices. The fourth computing platform 428 may be scalable; i.e., each may employ any of a scale-up and scale-out approach. And the fourth computing platform 428 may be integrated into or otherwise combined with another apparatus.

The fourth computing platform 428 includes a processor, memory, I/O interfaces and support circuits. The processor, memory, I/O interfaces and support circuits may communicatively couple via one or more respective communication links or busses. The memory may store various software packages, including the operating systems and functional modules. The respective operating systems may include directives for operating the fourth computing platform 428. When retrieved from the memory and executed by the processor, the fourth computing platform 428 becomes a platform onto which the functional modules can be executed.

Each of functional modules includes one or more directives for causing the processor and/or the fourth computing platform 428 to carry out functions defined by such functional modules to facilitate, at least in part, providing conversion between signaling protocols. Any of the functional modules may be in any of a standalone, client/server, peer-to-peer and other format.

Although the functional modules are described herein as software packages, the functional modules and/or the directives thereof may be formed in hardware and/or firmware. For example, the functional modules and/or the directives thereof may be ported or otherwise arranged for and implemented in any of a FPGA, ASIC, SoC and CPLD.

The fourth computing platform 428 may be or embody a unified communications manager ("UCM"), and as shown, includes the H.225/SCCP-conversion engine 118. An example of the UCM may be a Cisco Unified Call Manager. The networking node 430 may communicatively couple to the UCM via communication link 409. The networking node 430 may be or embody any of a bridge, a switch, a router and the like. The IP-phones 406, in turn, communicatively couple to the networking node 430 via respective communication links 407.

As noted, the VM server 110 provides voicemail services to the subscriber. Thus, for example, the subscriber may access the voicemail inbox and performs multiple functions, such as forwarding a received voicemail to another subscriber, composing a voicemail and the like. In addition, the VM server 110 allows a non subscriber to leave a voicemail at the VM server 110 for the subscriber.

Alternative Example Operation

Figure 5A:
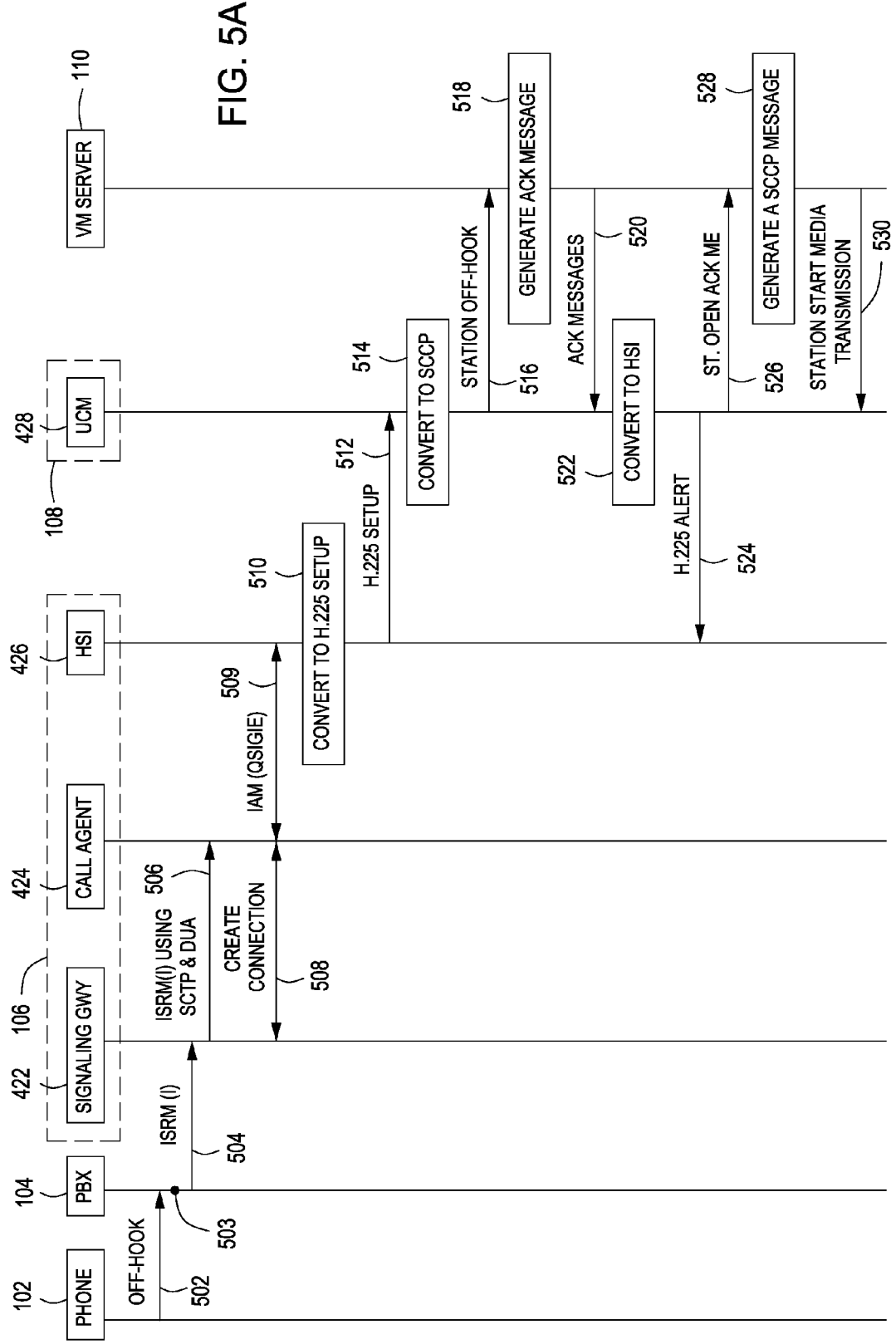
FIGS. 5A and 5B are call flow diagrams illustrating a first example call flow for performing signaling for setting up a call connection between a phone and a voicemail server.
Figure 5B:
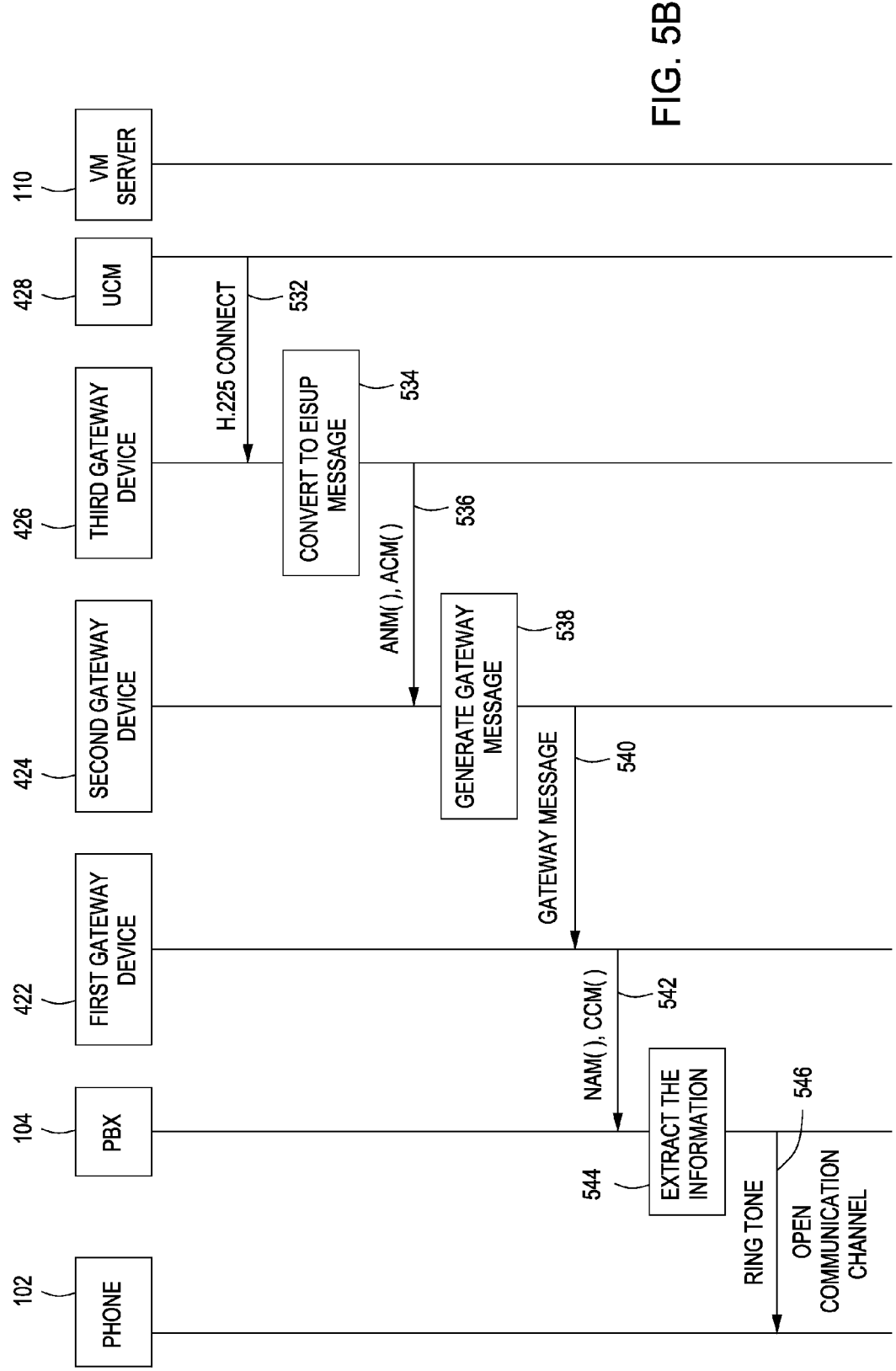

FIGS. 5A and 5B are call flow diagrams illustrating an example call flow 500 for performing signaling for setting up a call connection between a phone 102 and a VM server so as to facilitate serving voicemail services to a subscriber of the PBX and the voicemail services. For simplicity of exposition, the call flow 500 is described with reference to the systems 100, 400 of FIGS. 1 and 4. The call flow 500, however, may be carried out by other communication systems as well.

The call flow 500 starts at a call-flow indicator 502. Prior to the call flow indicator 502, each of the PBX 104, first gateway 106, second gateway 108 and VM server 110 become operative, such that their various software packages are retrieved from their respective memories and executed by their respective processors, thereby, making each of the PBX 104, first gateway 106, second gateway 108 and VM server 110 specially programmed computers to carry out any of the functions noted above and below. Any reference below to the various software packages assumes that such software package is (and directives therein are) under execution.

The phone 102 may go off hook and originate to the PBX 104 an upstream-vm indicator in form of an off-hook signal, as shown by call flow indicator 502.

The PBX 104 may then detect the off-hook signal and generate an upstream-DPNSS message in form of an Initial Service Request Message (Incomplete) ("ISRM (I)"). The PBX 104 may thereafter backhaul or otherwise transmit the ISRM (I) to the first gateway 106 over the first communication link 105, as shown by call flow indicator 504.

The signaling gateway 422 may receive and then backhaul the ISRM (I) to the call agent 424 via the first-gateway-communication link 411 using a stream control transmission protocol ("SCTP") and a User Adaptation (DUA) protocol for the DPNSS, as shown by call flow indicator 506. As indicated by call-flow indicator 508, the call agent 424 may generate a Create Connection ( ) message ("CCM( )") in accordance with MGCP, and then transmit it to the signaling gateway 422 via the first-gateway-communication link 411.

The call agent 424 may also pass the ISRM(I) to the DPNSS/MGCP-conversion engine 112, via the second-gateway-communication link 413 so as to cause selection of one or more upstream-Qsig IEs and generation of an upstream-EISUP message with the upstream-Qsig IEs tunneled therein. Thereafter, the call agent 434 may generate an Initial Address Message ("IAM") in accordance with the EISUP, and then transmit it to the HSI 426 via the second-gateway-communication link 413. The IAM may include parameters ("IAM parameters"), such as any of a calling number assigned to the VM server 110, a calling number assigned to the phone 102 and a name of assigned to the phone 102. And using the upstream-EISUP message, the call agent 434 may tunnel the upstream-Qsig IEs into the IAM parameters.

As shown at call-flow indicator 510, the HSI 426 may convert the IAM ( ) into an upstream-H.225 message in form of a H.225 Call Setup Message. To facilitate this, the HSI 426 may pass the IAM( ) to the EISUP/H.225-conversion engine 116. The EISUP/H.225-conversion engine 116 may extract the upstream-Qsig IEs from the IAM( ) and then tunnel them into the H.225 Call Setup Message.

As shown by call-flow indicator 512, the HSI 426 may transmit the H.225 Call Setup Message to the UCM 428 via the second communication link 107. The UCM 428 may then convert the H.225 Call Setup Message into an upstream-SCCP message in form of a Station Off Hook Message ( ), as shown by call flow indicator 514. To facilitate this, the UCM 428 may pass the H.225 Call Setup Message to the H.225/SCCP-conversion engine 118. The H.225/SCCP-conversion engine 118 may extract the upstream-Qsig IEs from the H.225 Call Setup Message, and using the upstream-Qsig IEs, may generate the Station Off Hook Message ( ). As shown by call-flow indicator 516, the UCM 428 may then transmit the Station Off Hook Message ( ) to the VM server 110 via the third communication link 109.

At a call-flow indicator 518, the VM server 110 may accept the Station Off Hook Message ( ) and generate a downstream-SCCP message in form on acknowledgement messages, such as, a Station Activate Call Plane Message ( ) and Station Start Tone Message ( ). As shown by call-flow indicator 520, the VM server 110 may then transmit the acknowledgement messages to the UCM 428 via the third communication link 109. Thereafter, the UCM 428 may then convert the acknowledgement messages to a downstream-H.225 message in form of a H.225 alert message, as shown by call-flow indicator 522. To facilitate this, the UCM 428 may pass the acknowledgement messages to the H.225/SSCP-conversion engine 118. The H.225/SSCP-conversion engine 118 may, responsive to the acknowledgment messages, locate and tunnel downstream-Qsig IEs into the H.225 alert message. As shown by call-flow indicator 524, the UCM 428 then transmits the H.225 alert message to the HSI 426.

The UCM 428 may also transmit to the VM server 110, in response to the acknowledgement messages, a second upstream-SCCP message in form of a Station Open Receive Channel Ack Message ( ), as shown by call flow indicator 526. The VM server 110 may generate a second downstream-SCCP message in form of a Station Start Media Transmission ( ) message, as shown by call-flow indicator 528. And as shown by call flow indicator 530, the VM server 110 may then transmit the Station Start Media Transmission ( ) message to the UCM 428 via the third communication link 109.

As shown by call-flow indicator 532, the UCM 428 may transmit to the HSI 426, via the second communication link 107, a second downstream-H.225 message in form of a H.225 Connect Message. This H.225 Connect Message may include the downstream-Qsig IEs. At call-flow indicator 534, the HSI 426 may convert the H.225 alert and H.225 Connect message to corresponding downstream EISUP messages. To facilitate this, the HSI 426 may pass the H.225 alert and H.225 Connect messages to the EISUP/H.225-conversion engine 116. The EISUP/H.225-conversion engine 116 may then convert the H.225 alert message into a first downstream-EISUP in form of an Address Complete Message ("ACM"), and may convert the H.225 Connect message into a second downstream-EISUP message in form of an EISUP answer message ("ANM").

As shown by call-flow indicator 536, the HSI 426 may then transmit the ACM and the ANM to the call agent 424 via the second-gateway-communication link 413. As shown by call-flow indicator 538, the call agent 426 may generate (i) a first downstream-MGCP message in form of a Modify Connection ( ), and (ii) a second downstream-MGCP message in form of a CCM ( ) for the PBX 104 responsive to the ANM. The call agent 424 may also generate, responsive to the ACM, a Number Acknowledge Message ("NAM ( )") for the PBX 104.

As shown by call-flow indicator 540, the call agent 424 may transmit the CCM ( ) and NAM ( ) to the signaling gateway 422. The signaling gateway 422, in turn, may transmit the CCM ( ) and NAM ( ) to the PBX 104 via the first communication link 105, as shown by call flow indicator 542. As shown by call-flow indicator 544, the PBX 104 may receive the CCM ( ) and the NAM ( ). In turn, the PBX 104 may use the CCM ( ) and NAM ( ) to further facilitate establishing, maintaining and/or tearing down the communication for providing the voicemail services to the subscriber.

Figure 6A:
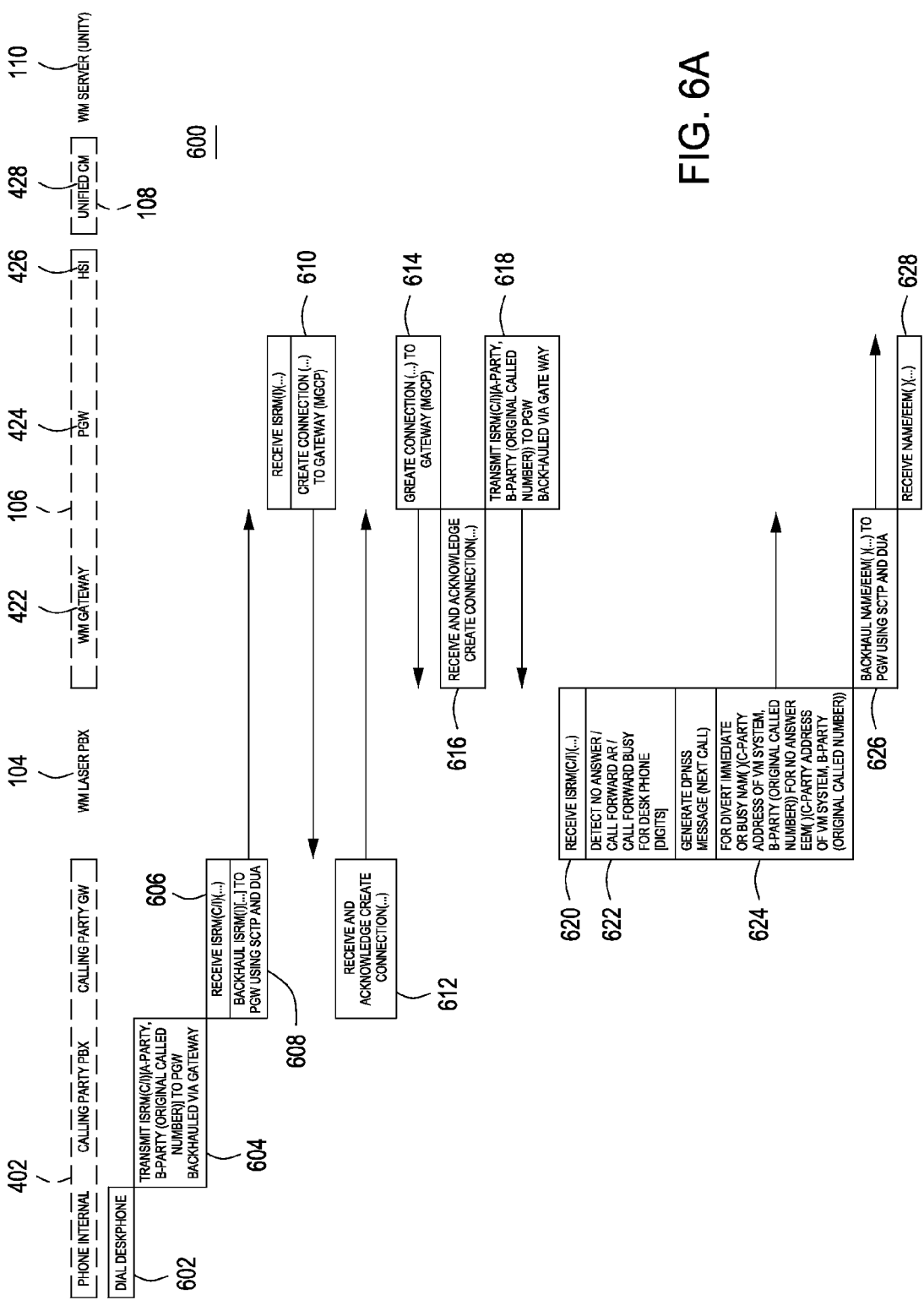
FIGS. 6A and 6B are call flow diagrams illustrating a second example call flow for performing signaling for re-routed call connection between a phone coupled to a private branch exchange and a voicemail server.
Figure 6B:
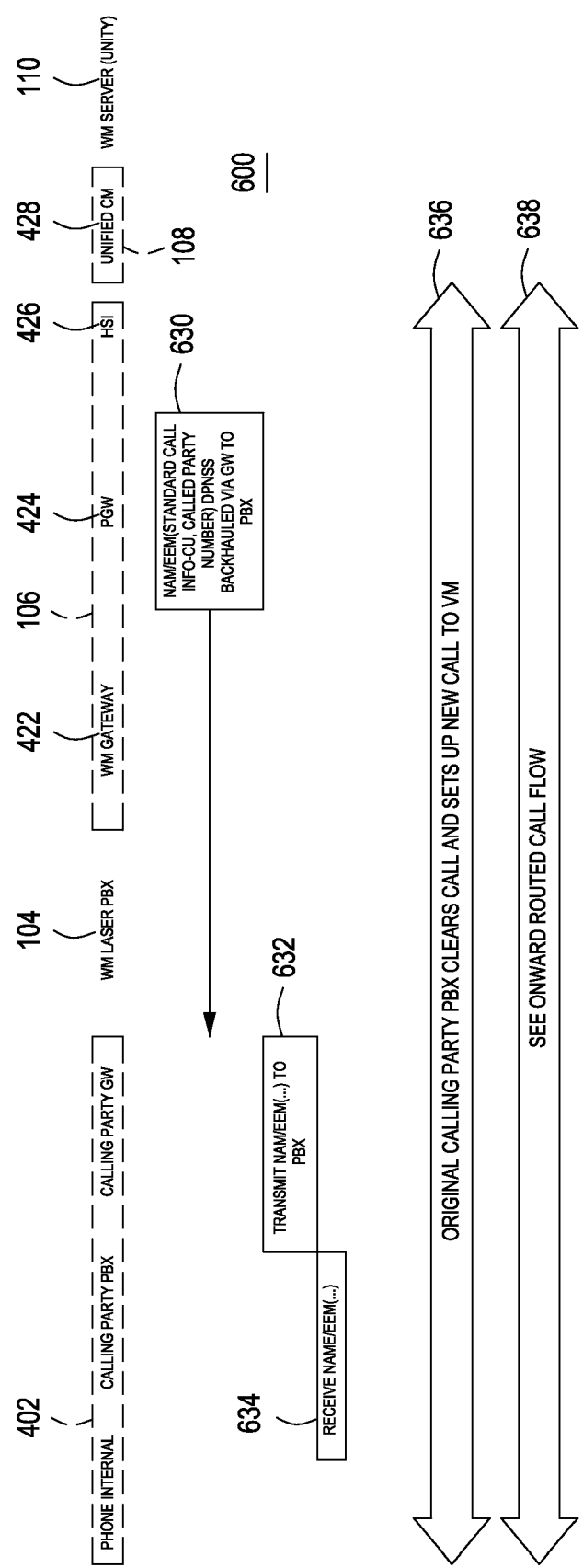

FIGS. 6A and 6B are call flow diagrams illustrating an example call flow 600 for performing signaling for re-routed call connection between a phone coupled to an external PBX (e.g., black phone 402) and a VM server so as to facilitate serving voicemail services to a subscriber of the PBX and the voicemail services. For simplicity of exposition, the call flow 600 is described with reference to the systems 100, 400 of FIGS. 1 and 4. The call flow 600, however, may be carried out by other communication systems as well.

The call flow 600 starts at a call-flow indicator 602. Prior to the call flow indicator 602, each of the PBX 104, first gateway 106, second gateway 108 and VM server 110 become operative, such that their various software packages are retrieved from their respective memories and executed by their respective processors, thereby, making each of the PBX 104, first gateway 106, second gateway 108 and VM server 110 specially programmed computers to carry out any of the functions noted above and below. Any reference below to the various software packages assumes that such software package is (and directives therein are) under execution.

The black phone 402 may go off hook and originate to the external PBX an upstream-vm indicator in form of the calling number for the phone 102 ("called-party number"), as shown by call flow indicator 602. The calling-party PBX may detect the called-party number, generate an upstream-DPNSS message in form of an ISRM (C/I), and then backhaul or otherwise transmit the ISRM (C/I) to a gateway associated with the calling-party PBX ("calling-party gateway"), as shown by call flow indicator 604. The ISRM parameters may include the called-party number and a number of the calling party ("calling-party number"). The calling-party gateway may receive the ISRM (C/I) over the first communication link 105, as shown by call flow indicator 606.

The calling-party gateway may then backhaul the ISRM (I) to the call agent 424 using the SCTP and DUA protocol, as shown by call flow indicator 608. As indicated by call-flow indicator 610, the call agent 424 may generate a first CCM ( ) in accordance with MGCP, and then transmit it to the calling-party gateway. Responsively, the calling-party gateway receives and acknowledges the first CCM ( ), as shown by call flow indicator 612.

As indicated by call-flow indicator 614, the call agent 424 may also generate a second CCM ( ) in accordance with MGCP, and then transmit it to the signaling gateway 422 via the first-gateway-communication link 411. The signaling gateway 422 may, in response, receive and acknowledge the second CCM ( ), as shown by call flow indicator 616. The call agent 424 may further transmit the ISRM (C/I) over the first communication link 105 to the PBX 104, as shown by call flow indicator 606.

The PBX 104, in turn, may receive the ISRM (C/I) from the call agent 424, as shown by call flow indicator 620. After receipt, the PBX 104 may detect a no answer, call forward all and/or call-forward busy condition for the phone 102, as shown by call flow indicator 622. Responsively, the PBX 104 may generate an upstream-DPNSS message in form of either (i) a NAM ( ) for the call forward all or call-forward busy condition or (ii) an EEM( ) for the no answer condition, as shown by call flow indicator 624.

As shown by call flow indicator 626, the PBX104 may backhaul the NAM ( ) or EEM( ) to the call agent 424 via the first-gateway-communication link 411 using the SCTP and DUA protocol, as shown by call flow indicator 626. The call agent 424 may receive the NAM ( ) or EEM( ), as shown by the call flow indicator 628. Responsively, the call agent 414 may backhaul the NAM ( ) or EEM( ) to the calling-party PBX via the calling-party gateway using the SCTP and DUA protocol, as shown by call flow indicator 630. By doing so, the NAM ( ) or EEM( ) so backhauled becomes a downstream-DPNSS message.

After receipt, the calling-party gateway may relay the NAM ( ) or EEM( ) to the calling-party PBX, as shown by the call flow indicator 632. The calling-party PBX may then receive the NAM ( ) or EEM( ), as shown by call flow indicator 634. The calling-party PBX, in turn, may clear the call setup, and initiate a new call to the VM server 110, as shown by call flow indicator 636. To facilitate this, the calling-party PBX may use the call flow 500 of FIGS. 5A and 5B, substituting the black phone 402 for the phone 102.

Figure 7:
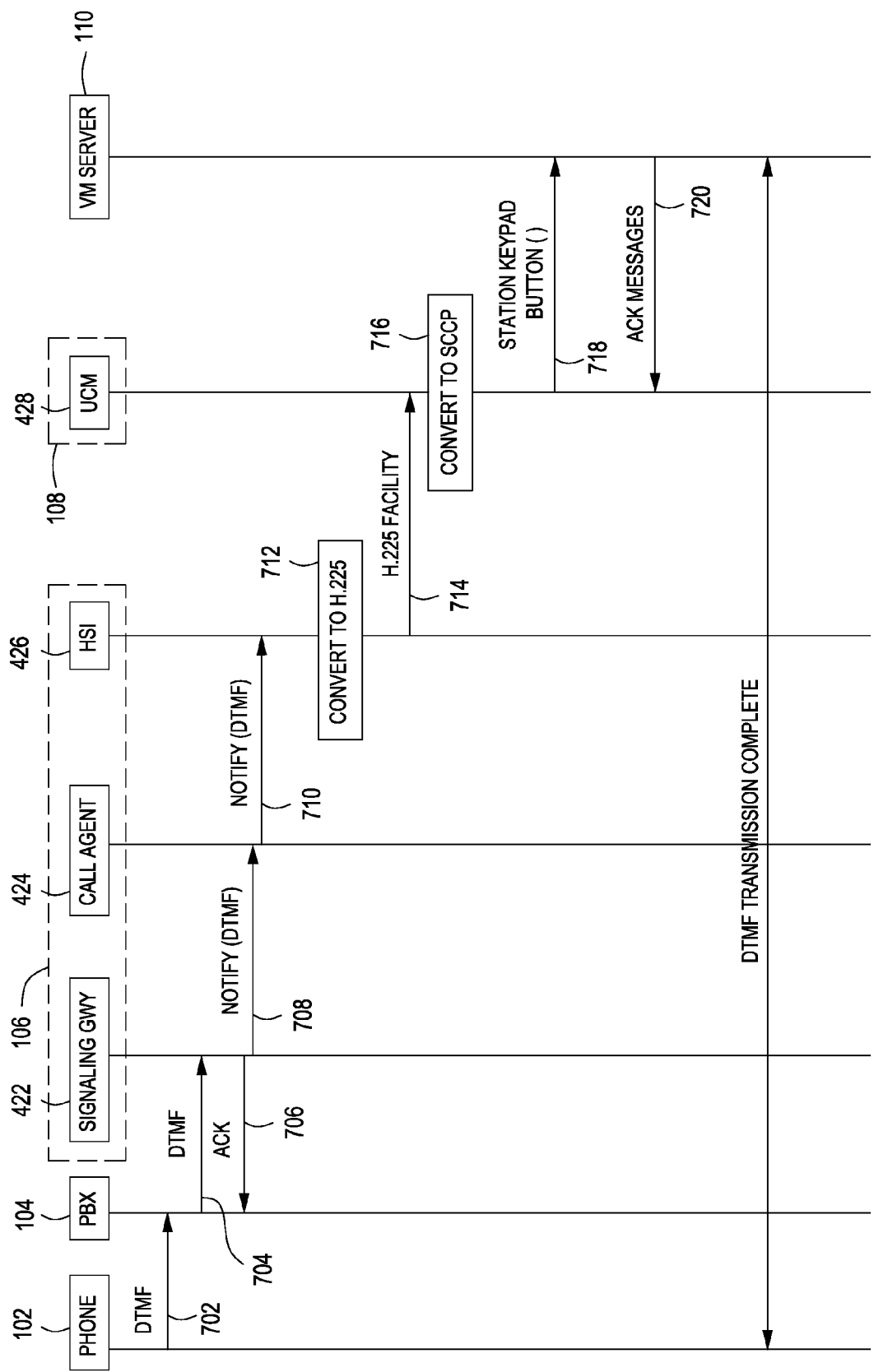
FIG. 7 is call flow diagram illustrating a third example call flow for performing signaling for DTMF transmission between a phone and a voicemail server.

FIG. 7 is call flow diagram illustrating an example call flow 700 for performing signaling for DTMF transmission between a phone and a VM server so as to facilitate serving voicemail services to a subscriber of the PBX and the voicemail services. For simplicity of exposition, the call flow 700 is described with reference to the systems 100, 400 of FIGS. 1 and 4. The call flow 700, however, may be carried out by other communication systems as well.

The call flow 700 starts at a call-flow indicator 702. Prior to the call flow indicator 702, each of the PBX 104, first gateway 106, second gateway 108 and VM server 110 become operative, such that their various software packages are retrieved from their respective memories and executed by their respective processors, thereby, making each of the PBX 104, first gateway 106, second gateway 108 and VM server 110 specially programmed computers to carry out any of the functions noted above and below. Any reference below to the various software packages assumes that such software package is (and directives therein are) under execution As shown by call-flow indicator 702, the phone 102 may generate an upstream-vm indicator in the form of Dual Tone Multiple Frequency (DTMF) signals and transmit these signals to the PBX 104. Such signals may define the calling number of the VM server 110.

The PBX 104 may receive the DTMF signals and use upstream-DPNSS messages to interface with the first gateway 106 over the first communication link 105. As shown by call flow indicator 704, The PBX 104 may then transmit to the signaling gateway 422 in band.

After receipt of the DTMF signals, the signaling gateway 422 may send to the PBX 104 an acknowledgment message via the first communication link 105, as shown by call flow indicator 706. The signaling gateway 422 may also generate and send to the call agent 424 multiple Notify messages; one for each digit representative of the DTMF signals, as shown by call flow indicator 708. After receiving the Notify messages, the call agent 424 may relay them to the HSI 426, as shown by call indicator 710. The HSI 426 may convert the Notify messages to an upstream-H.225 message in form on H.225 Facility message with user-input indication informational element, as shown by call flow indicator 712. The user-input indication may be representative of the DTMF digits.

After generating the H.225 Facility message, the HSI 426 may transmit it to the UCM 428 via the second communication link 107, as shown by call flow indicator 714. The UCM 428 may then convert the H.225 Facility message to an upstream-SCCP message in a Station Key Pad Button Message ( ) as shown by call flow indicator 716. As shown by call-flow indicator 718, the UCM 428 transmits the Station Key Pad Button Message ( ) to the VM server 110.

At a call-flow indicator 720, the VM server 110 accepts the Station Key Pad Button Message ( ) and acknowledges the UCM 428 with acknowledgement messages, such as, Station Stop Tone Message ( ) Station Call Information Message ( ) Station Open Receive Channel Message ( ) and Station Start Media Transmission Message ( ).

Example embodiments have been illustrated and described. Further, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method for providing voicemail services to a subscriber of a private-branch exchange, the method comprising:
   exchanging, between a first gateway and a private-branch exchange, a first signaling message formed in accordance with a first signaling protocol of a digital private network signaling system;
   exchanging, between the first gateway and a second gateway, a second signaling message formed in accordance with a second signaling protocol for serving voice over internet-protocol services;
   exchanging, between the second gateway and a server for serving voicemail services, a third signaling message formed in accordance with a terminal-control protocol for an internet-protocol network;
   converting, at the first gateway, between the first and second signaling messages by processing the first signaling message to obtain the second signaling message for upstream communications and by processing the second signaling message to obtain the first signaling message for downstream communications; and
   converting, at the second gateway, between the second and third signaling messages by processing the second signaling message to obtain the third signaling message for upstream communications and by processing the third signaling message to obtain the second signaling message for downstream communications.

2. The method of claim 1, wherein the first signaling protocol is defined in accordance with BTNR188.

3. The method of claim 1, wherein the second signaling protocol is defined accordance with H.323.

4. The method of claim 1, wherein the terminal-control protocol for an internet-protocol network is defined in accordance with Skinny Call Control Protocol.

5. The method of claim 1, wherein converting between the first and second signaling messages comprises: converting between the first signaling message and an interim signaling message using a protocol for an integrated services digital network.

6. The method of claim 5, wherein the protocol for an integrated services digital network is defined in accordance with QSIG.

7. The method of claim 1, wherein converting between the first and second signaling messages comprises:
   converting between the first signaling message and a first interim signaling message using a media gateway control protocol;
   converting between the first interim signaling message and a second interim signaling message using a third signaling protocol for an integrated services digital network;
   tunneling the second interim signaling message with an informational element formed in accordance with a fourth signaling protocol for an integrated services digital network; and
   converting between the second interim signaling message and the second signaling message.

8. The method of claim 7, wherein the third signaling protocol is defined in accordance with integrated services digital network user part protocol, and wherein the fourth signaling protocol is defined in accordance with QSIG.

9. A system for providing voicemail services for a phone coupled to a private-branch exchange, the system comprising: a first gateway, a second gateway and a server for serving voicemail services, wherein the first gateway is configured to: (i) exchange with the private-branch exchange a first signaling message that is formed in accordance with a first signaling protocol for a digital private network signaling system; (ii) exchange with the second gateway a second signaling message that is formed in accordance with a second signaling protocol for service voice-over-internet-protocol services; and (iii) convert between the first signaling message and a second signaling message by processing the first signaling message to obtain the second signaling message for upstream communications and by processing the second signaling message to obtain the first signaling message for downstream communications;

the second gateway configured to: (i) exchange with the first gateway the second signaling message; (ii) exchange with the server a third signaling message that is formed in accordance with a terminal-control protocol for an internet-protocol network; and (iii) convert between the second and third signaling messages by processing the second signaling message to obtain the third signaling message for upstream communications and by processing the third signaling message to obtain the second signaling message for downstream communications; and the server configured to: (i) exchange with the second gateway the third signaling message, and (ii) serve the voicemail services.

10. The system of claim 9, wherein the first signaling protocol for a digital private network signaling system is defined in accordance with BTNR188.

11. The system of claim 9, wherein the second signaling protocol network is defined accordance with H.323.

12. The system of claim 9, wherein the terminal-control protocol for an internet-protocol network is defined in accordance with Skinny Call Control Protocol.

13. The system of claim 9, wherein, to convert between the first and second signaling message, the first gateway is configured to: convert between the first signaling message and an interim message using a protocol for an integrated services digital network.

14. The system of claim 13, wherein the protocol for an integrated services digital network is defined in accordance with a digital private network signaling system (DPNSS).

15. The system of claim 9, wherein, to convert between the first and second signaling message, the first gateway is configured to: (i) convert between the first signaling message to a first interim signaling message using a media gateway control protocol; (ii) converting between the first interim signaling message and a second interim signaling message using a third signaling protocol for an integrated services digital network; (iii) tunneling the second interim signaling message with an informational element that is formed in accordance with a fourth signaling protocol for an integrated services digital network; and (iv) converting between the second interim message and the second signaling message.

16. The system of claim 15, wherein the third signaling protocol is defined accordance with integrated services digital network user part protocol, and wherein the fourth signaling protocol is defined in accordance with QSIG.

17. A system for providing voicemail services for a phone coupled to a private-branch exchange, the system comprising:

a server configured to: (i) serve the voicemail services; and (ii) transmit a first message, wherein the first message is formed in accordance with a terminal-control protocol for an internet-protocol network;

a first gateway configured to: (i) receive the first message; (ii) convert the first message to a second message by processing the first message to obtain the second message for upstream communications, wherein the second message is formed in accordance with a first signaling protocol for an integrated services digital network; and (iii) transmit the second message; and a second gateway configured to: (i) receive the second message; (ii) convert the second message to a third message by processing the second message to obtain the third message for upstream communications, wherein the third message is formed in accordance with a second signaling protocol for a digital private network signaling system; and (iii) transmit the third message to the private-branch exchange.

18. The system of claim 17, wherein, to convert the second message to a third message, the second gateway is configured to: (i) convert the second message to an interim message using a protocol for providing services in accordance with a voice over internet protocol; and (ii) convert the interim message to the third message.

19. The system of claim 17, wherein, to convert the second message to a third message, the second gateway is configured to: (i) convert the second message to a first interim message using a protocol for providing services in accordance with a voice over internet protocol; (ii) convert the first interim message to a second interim message using a third signaling protocol for an integrated services digital network; and (iii) convert the second interim message to the third message.

* * * * *